Figure 1:
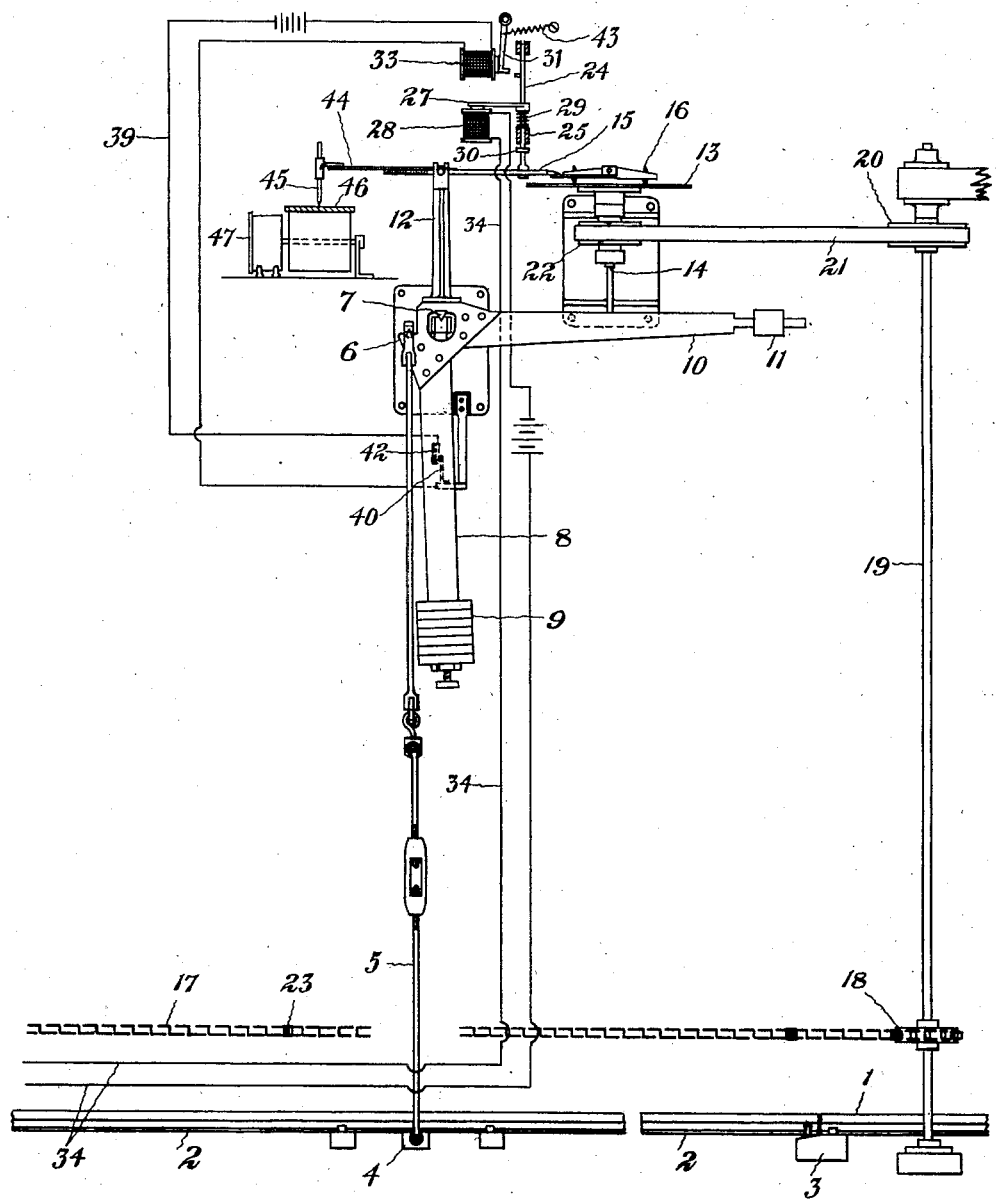

H. E. T. HAULTAIN.
REGISTERING WEIGHING APPARATUS.
APPLICATION FILED JULY 20, 1911.

1,029,120.

Patented June 11, 1912.
2 SHEETS—SHEET 1.

WITNESSES:
W. J. McMillan
E. P. Hall.

INVENTOR.
H. E. T. Haultain
BY J. Edward Maybee
ATTORNEY

H. E. T. HAULTAIN.
REGISTERING WEIGHING APPARATUS.
APPLICATION FILED JULY 20, 1911.

1,029,120.

Patented June 11, 1912.
2 SHEETS—SHEET 2.

WITNESSES:
H. G. McMillan
E. P. Hall

INVENTOR.
H. E. T. Haultain
BY J. Edward Maybee
ATTORNEY.

UNITED STATES PATENT OFFICE.

HERBERT E. T. HAULTAIN, OF TORONTO, ONTARIO, CANADA.

REGISTERING WEIGHING APPARATUS.

1,029,120.

Specification of Letters Patent.　Patented June 11, 1912.

Application filed July 20, 1911. Serial No. 639,497.

*To all whom it may concern:*

Be it known that I, HERBERT E. T. HAULTAIN, of the city of Toronto, in the Province of Ontario, Canada, have invented certain new and useful Improvements in Registering Weighing Apparatus, of which the following is a specification.

This invention relates to apparatus for registering the weight of loads moving continuously or intermittently over the apparatus such as described in United States applications Serial Nos. 478,483 and 589,603.

I have found, particularly when intermittent loads are sent over the apparatus at a high rate of speed, that the weighing mechanism is liable to oscillate so that the readings of the registering mechanism at any given moment after a load has passed off may be less or greater than the true weight. While the true weight will be indicated supposing the apparatus to be at rest when the load comes on and to be allowed to come to rest again after the load has moved off yet it is not always feasible to wait till the oscillations die down before taking a reading, nor is it always feasible to wait till the weighing apparatus is at rest before sending a new load over it, and I therefore deem it necessary to provide means to reduce jar on the apparatus as much as possible and to prevent any oscillations from affecting the readings.

In application Serial No. 478,483 the load was applied gradually to the weighing apparatus; in the present invention the load is not only applied gradually but also removed gradually which is also of great importance as it tends to reduce the jar when the load is passing off which is the time when a reading requires to be taken when intermittently applied loads require to be separately weighed.

I also provide means whereby the registering mechanism is normally inoperative and is only conditioned for operation as a load approaches the apparatus and when the weighing apparatus is in a predetermined position, and whereby when the load passes off the registering mechanism is again rendered inoperative at a time when the weighing apparatus is again in the predetermined position. By such an arrangement the registering mechanism may be rendered operative and inoperative at such positions of the weighing apparatus that the plus and minus oscillations balance one another and the true weight is given.

When the apparatus is arranged as above described intermittent loads may be sent over the apparatus as rapidly and in as close succession as may be desired and the weights of the separate loads and their total weight accurately registered.

Figure 2:
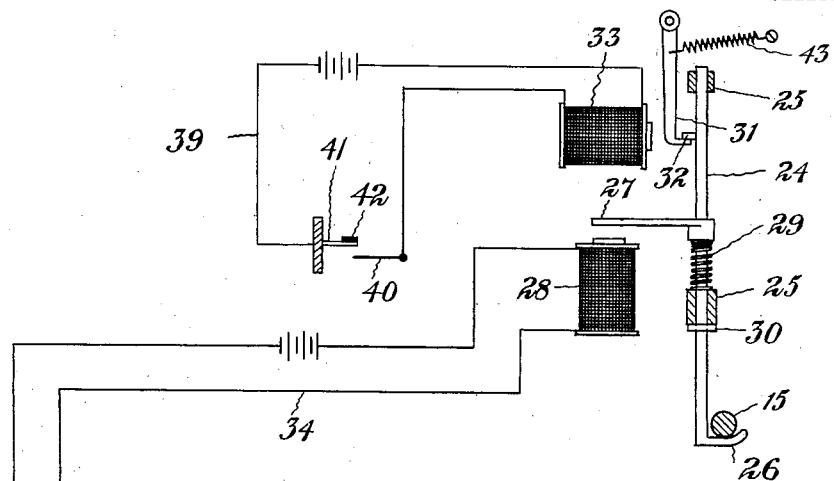
Figure 3:
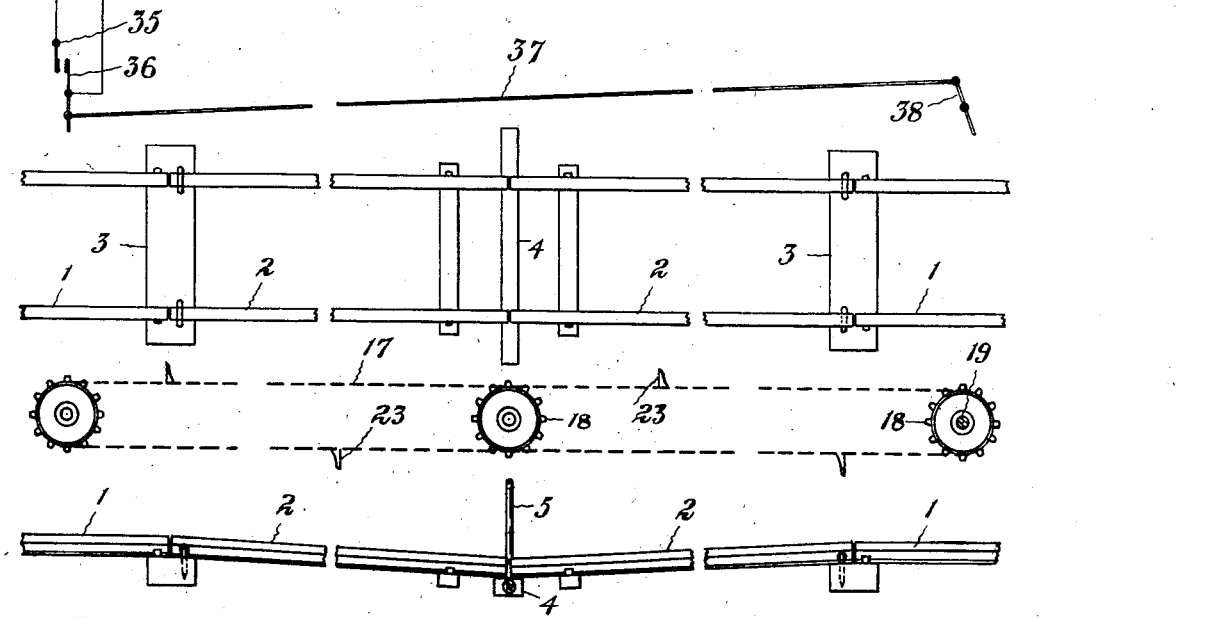

Figure 1 is a side elevation partly diagrammatic of apparatus constructed in accordance with my invention. Fig. 2 is a diagrammatic plan view of the same. Fig. 3 is a side elevation of the tracks by means of which the load is applied to and removed from the weighing apparatus.

In the drawings like figures of reference indicate corresponding parts in the different figures.

1 represents a railway track on which may run the trucks or cars forming or carrying the movable load. In the track is formed a depressible section by means of which the load may be gradually applied to and taken off the weighing apparatus. This section is preferably arranged as follows:—Pairs of rails 2 are tiltably supported on the ties 3 and are similarly supported on a bolster 4 at their adjacent ends. This bolster is supported by a yoke 5 connected with the weighing apparatus. This weighing apparatus is of the same type as that disclosed in my copending application No. 589,603 in which a four armed weighing lever is employed. The yoke 5 is connected with the short arm 6 of the weighing lever which is pivotally supported at 7 in the ordinary manner.

The depending arm 8 carries the counterbalancing weight 9 for the live load and the substantially horizontal arm 10 carries the counter-balancing weight 11 for the dead load. The upwardly extending arm 12 actuates the registering or integrating and recording mechanisms. These mechanisms are preferably arranged substantially as in application No. 589,603 hereinbefore referred to and a general description thereof will suffice for the present purposes.

The rotary disk 13 is horizontally journaled by means of the spindle 14. A frame 15 pivotally connected with the arm 12 carries the integrating wheels 16 resting on the upper surface of the disk 13. The means by which the movements of the integrating wheels are recorded forms no part of the present invention, but an arrangement such as shown in United States application No. 478,483 or No. 589,760 may be employed. The operation of the integrating device requires that the rotary disk 13 be driven at a speed proportionate to the rate of travel of the load. For this purpose I support an endless chain or belt 17 adjacent the tracks, this belt being guided and supported on the horizontally arranged sprocket wheels 18 journaled on suitable supports. One sprocket wheel is arranged to drive the vertical spindle 19 which is provided with a pulley 20 driving by means of a belt 21 the pulley 22 on the spindle 14 of the rotary disk 13. The sprocket chain is provided with fingers 23 which may be engaged by any suitable projecting part of a car or truck. When so engaged the motion of the truck is imparted to the sprocket chain and thence to the rotary disk 13 which must then necessarily be driven at a speed proportionate to the rate of travel of the load.

To start and stop the integrating mechanism it is merely necessary to separate the rotary disk and the integrating wheels which is most readily accomplished by swinging up the frame 15. The mechanism for effecting this is diagrammatically shown and in practice may differ considerably therefrom in mechanical construction. A vertical slide 24 is suitably supported in guides 25 and is provided with a hook 26 adapted to engage beneath part of the frame 15. This slide has the armature 27 of an electro-magnet 28 secured thereto. When the magnet is energized it tends to draw down the armature and lower the frame 15 to start the operating of the integrating mechanism. A coil spring 29 is arranged between one of the guides 25 and the armature 27 and tends to lift the slide to cause it to raise the frame and stop the integrating mechanism. A collar 30 secured on the slide limits its upward movement. Normally the slide is held raised as shown in Fig. 2 by means of a pivoted latch 31 which is adapted to engage either above or below the lug 32 on the side of the slide. This pivoted latch forms the armature to an electro-magnet 33 which when energized attracts the latch 31 and releases the slide which is then under the control of the electro-magnet 28 and the coil spring 29.

34 is the circuit of the electro-magnet 28 and includes, of course, a suitable source of energy. In this circuit is arranged the switch 35 of which 36 is the movable arm and which is arranged in suitable position to be engaged by any suitable projecting part of a truck or car just before the latter comes on to the movable rails. The movable arm 36 is connected by a rod 37 with a second movable or pivoted arm 38 so located as to be engaged by a suitable projection on a truck or car just as the latter has passed off the movable rails. By this arrangement the electro-magnet 28 may be energized just before a car reaches the movable rails and deenergized just as it has passed off.

In the first position the electro-magnet tends to start the operation of the integrating mechanism and in the second position the spring tends to stop it. No movement can however take place unless the latch 31 is released. This release is effected through the weighing lever in the following manner: The circuit 39 of the electro-magnet 33 includes a suitable source of energy and is arranged to be closed and opened in the following manner: The wire forming the circuit is divided and one end is connected with the spring finger 40 while the other is in electrical connection with a finger 41 secured preferably to the depending arm 8 of the weighing lever. This finger has a piece of insulation 42 at one side so that as the arm 8 oscillates it makes contact with the finger when moving in one direction only. The finger 40 is of course so proportioned that the finger 41 will readily brush by it back and forth. This make and break device may be readily set so that the circuit of the electro-magnet 33 is completed at any desired position of the arm 8, preferably its zero position.

From this arrangement it follows that as a car approaches the movable rails it first conditions the stop mechanism for the integrating device so that it tends to move to the release position. If the weighing lever be at zero or such other position as may be predetermined the latch 31 will be released and the integrating mechanism at once placed in operative condition through the drawing down of the slide 24 by the electro-magnet 28. If the weighing lever be in a state of oscillation the latch mechanism will not be conditioned to put the integrating mechanism into operative condition, until the weighing lever occupies the predetermined position. When the car moves off the movable tracks it contacts with the arm 38 and deënergizes the electro-magnet 28. The spring 29 then tends to stop the operation of the integrating mechanism, but, of course, as soon as the load went on the movable rails the weighing lever was swung and the electro-magnet 33 deënergized allowing the latch 31 to engage above the lug 32 thus locking the latch mechanism. The integrating mechanism, therefore, after the car has passed off the track, will not be stopped until the weighing lever has again assumed the predetermined position when, of course, the electro-magnet 33 is again energized and the latch 31 released. A coil spring 43 tends to maintain the latch 31 in its engaging position with the lug 33. By this arrangement the integrating mechanism may be stopped and started at such positions that plus and minus oscillations of the weighing lever exactly balance one another. Also by the arrangement of the tracks as shown the tendency of the rapidly moving load to cause jar is considerably diminished.

I illustrate also a load recording device. This includes a frame 44 pivotally connected with the upper end of the upwardly extending arm 12. This arm carries a pencil 45 adapted to engage a surface 46 suitably driven by the clock 47. This device may be arranged in detail as in my prior United States application No. 589,603 and the records taken therefrom may be used to determine the proper setting for the mechanism controlling the stopping and releasing of the integrating mechanism.

What I claim as my invention is:—

1. In a registering weigher the combination of weighing mechanism; registering mechanism controlled thereby; means for driving said registering mechanism; and means controlled by the weighing mechanism for automatically stopping the registering mechanism at a predetermined position of the weighing mechanism.

2. In a weigher adapted to register the weight of moving loads, the combination of weighing mechanism; registering mechanism controlled thereby; means for conditioning the registering mechanism for operation at a predetermined position of the weighing mechanism before the load comes on the apparatus; and means for automatically stopping the registering mechanism at a predetermined position of the weighing mechanism when the load goes off the apparatus.

3. In a registering weigher the combination of weighing mechanism; registering mechanism controlled thereby; stop mechanism actuable when a load comes off the weighing mechanism to tend to stop the registering mechanism; control mechanism actuable by the weighing mechanism at a predetermined position of the latter to permit of the operation of the stop mechanism.

4. In a weigher adapted to register the weight of moving loads the combination of weighing mechanism; registering mechanism controlled thereby; stop mechanism for the registering mechanism; means actuable by a load before it comes on the weighing mechanism to condition the stop mechanism to tend to move to the release position and actuable by a load when it comes off the apparatus to condition the stop mechanism to tend to move to the stop position; and control mechanism normally tending to lock the stop mechanism in either its stop or release position and actuable by the weighing mechanism at a predetermined position of the latter to release the stop mechanism.

5. In weighing apparatus a depressible load supporting frame across which a load may be caused to travel comprising two parts supported by the weighing apparatus at their adjacent ends and hinged on stationary supports at their distant ends whereby the effect of a traveling load gradually increases from zero to a maximum and decreases to zero again in combination with a weight integrating device; means for driving said device actuated at a rate proportionate to the rate of travel of the load; and means whereby the said integrating device is governed as to rate of action in proportion to the depression of the aforesaid frame.

6. In weighing apparatus a railroad track provided with a depressible section comprising two parts supported by the weighing apparatus at their adjacent ends and hinged on stationary supports at their distant ends, whereby the effect of a traveling load gradually increases from zero to a maximum and decreases to zero again in combination with a weight integrating device; means for driving said device actuated at a rate proportionate to the rate of travel of the load; and means whereby the said integrating device is governed as to rate of action in proportion to the depression of the aforesaid frame.

Toronto July 14th 1911.

HERBERT E. T. HAULTAIN.

Signed in the presence of—
J. EDW. MAYBEE,
E. P. HALL.